United States Patent
Masaki et al.

Patent Number: 5,599,513
Date of Patent: Feb. 4, 1997

[54] GAS DISTRIBUTION PLATE FOR USE WITH FLUIDIZED-BED GAS-PHASE POLYMERIZER

[75] Inventors: Toru Masaki; Setuo Kawano; Yuzo Saitoh; Hirozo Ijiri, all of Oita, Japan

[73] Assignee: Showa Denko K.K., Tokyo, Japan

[21] Appl. No.: 696,800

[22] Filed: May 7, 1991

[51] Int. Cl.$^6$ ..................................................... B01J 10/00
[52] U.S. Cl. .................. 422/311; 422/140; 261/114.3
[58] Field of Search ................... 422/311, 140, 422/13; 34/57 A, 57 B, 57 C; 261/114.3, 122, 79.2

[56] References Cited

U.S. PATENT DOCUMENTS

| | | | |
|---|---|---|---|
| 3,089,251 | 5/1963 | Helbig et al. | 34/57 A |
| 3,508,341 | 4/1970 | Price | 34/57 A |
| 3,672,577 | 6/1972 | Kramer | 34/57 A |
| 4,286,393 | 9/1981 | Schulz et al. | 34/57 A X |
| 4,475,467 | 10/1984 | Korenberg | 34/57 A X |
| 4,521,378 | 6/1985 | Ichimura et al. | 422/135 |
| 4,759,884 | 7/1988 | Michimae et al. | 261/114.3 X |
| 5,014,632 | 5/1991 | Isaksson | 422/311 X |

FOREIGN PATENT DOCUMENTS

| | | |
|---|---|---|
| 0070496 | 1/1983 | European Pat. Off. . |
| 0088404 | 9/1983 | European Pat. Off. . |
| 089691A2 | 9/1983 | European Pat. Off. . |
| 173261A2 | 3/1986 | European Pat. Off. . |
| 0243736 | 11/1987 | European Pat. Off. . |
| 1802550 | 5/1969 | Netherlands . |
| 1912844 | 11/1969 | Netherlands . |
| 3425519 | 1/1986 | Netherlands . |

*Primary Examiner*—Laura Edwards
*Attorney, Agent, or Firm*—Sughrue, Mion, Zinn, Macpeak & Seas

[57] ABSTRACT

A gas distribution plate for use with a fluidized-bed gas-phase polymerizer comprising a flat plate and a plurality of cylindrical or frustoconical pieces each having an oblique hole or a spiral groove cut in its surface. Each piece fits into a hole in the flat plate.

18 Claims, 2 Drawing Sheets

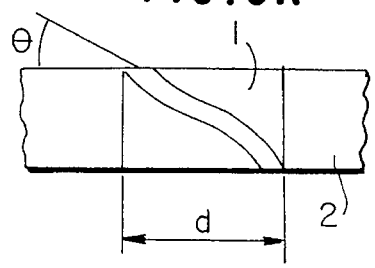
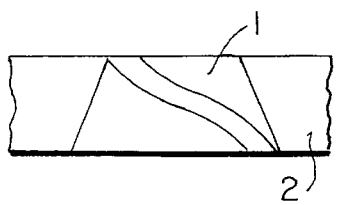
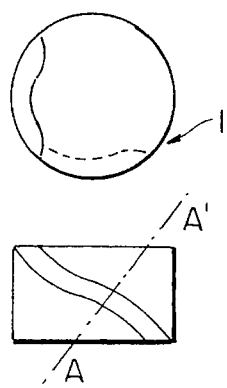
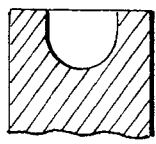
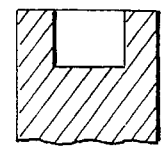
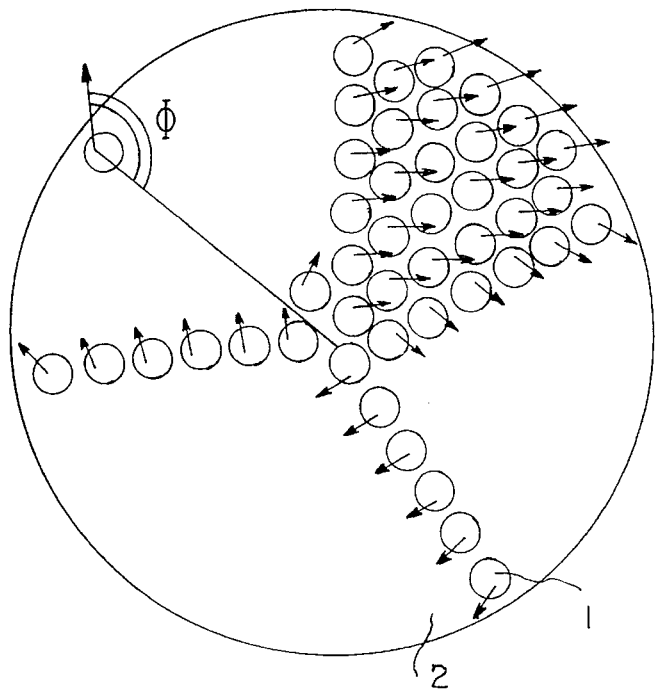
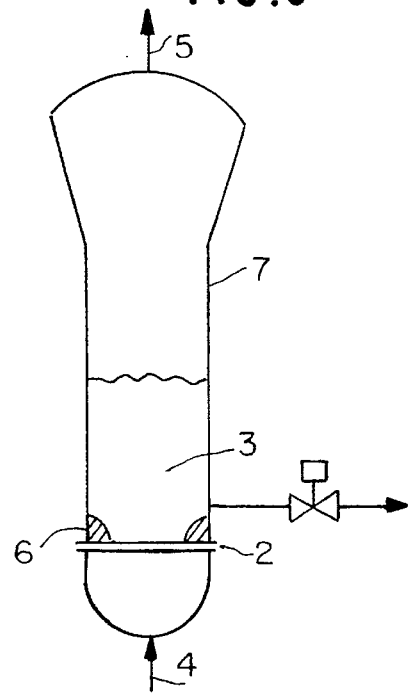

GAS DISTRIBUTION PLATE FOR USE WITH FLUIDIZED-BED GAS-PHASE POLYMERIZER

FIELD OF THE INVENTION

This invention relates to a fluidized-bed gas-phase polymerizer, more particularly to a gas distribution plate suitable for use in fluidized-bed gas-phase polymerization of olefins.

BACKGROUND OF THE INVENTION

For producing polyolefins using highly active catalysts, gas-phase polymerization processes, particularly those using a fluidized-bed polymerizer, are now extensively employed because they eliminate the step of removing spent catalyst and low-molecular weight polymer by-product.

FIG. 6 shows a typical fluidized-bed reactor for the polymerization of olefins. The reactor 7 is equipped with a gas distribution plate 2 through which olefin gas or an olefin-containing feed gas is supplied uniformly into a fluidized bed 3. This gas is introduced into the reactor through a suction pipe 4 at the bottom of the reactor; distributed uniformly by means of the distribution plate 2; and bubbles up through the bed of catalytic or reacting solids, thus fluidizing the bed to initiate and continue the polymerization reaction. The unreacted gases ascend through the fluidized bed 3 and are exhausted at a discharge pipe 5 atop the reactor, cooled and returned to the reactor via the suction pipe 4 for subsequent use.

If the feed gas is not uniformly distributed by the distribution plate 2, uniform agitation and mixing is not achieved in the fluidized bed 3 and the heat of polymerization is not completely removed from the fluidized bed. This is particularly a problem at the corners 6 defined by the inner surface of the side wall of the reactor and the distribution plate 2. Such non-uniform agitation can cause the formation of polymer aggregates and the deposition of polymer on the inside surface of the reactor, which alternately could lead to shutdown of the operation or deterioration in the quality of the product.

While perforated plates are commonly used as gas distribution plates, many proposals have been suggested to overcome the problem of non-uniform distribution by providing various types of caps above the porous plate. For example, JP-A-58-154702 (the term "JP-A" as used herein means an "unexamined published Japanese patent application") proposed a trigonal pyramidal cap; U.S. Pat. No. 4,521,378, a cap using partition walls; European Patent Application 89691A, a bubble cap; and European Patent Application 173261A, an angle cap.

A gas distribution plate having small holes has a problem in that even limited deposition of polymer particles can cause a blockage and greatly reduce the flow of gas passing through the holes in the plate.

Further, when unreacted gases that often contain fine polymer powder are exhausted through the discharge pipe 5 and recycled into the reactor, a portion of this fine polymer powder will be trapped by the gas distribution plate and block the upward passage of gas. If the gas distribution plate plugs up in this way, the polymerizer cannot be continuously operated for a prolonged period of time.

This blockage problem can be partly solved by using a gas distribution plate having large holes. But this solution creates additional problems. First, polymer particles will drop through the distribution plate and onto on the inside surface of the reactor below the plate where they can form polymer aggregates. Second, the distance between adjacent holes, or their pitch, must be extended to create low-fluidity areas between holes. In addition, in order to prevent blockage of the distribution plate and the dropping of polymer particles through it, the flow rate of the feed gas per hole must be maintained higher than a certain value.

The balance between these factors is difficult to achieve. If the flow per hole of a feed gas supplied into the polymerizer for a given total amount is increased by increasing the hole diameter, for example, the total number of holes in the distribution plate must be reduced, whereby the pitch of holes is extended. If the pitch of holes in a simple perforated plate which is adapted to blow gases upward in a vertical direction is increased, polymer particles in the intermediate area between adjacent holes are not blown off the plate by the ascending gas and instead are deposited and can form polymer aggregates.

With a view to solving these two problems, many proposals have been made that rely upon providing a cap above each of the holes in the gas distribution plate. However, the caps themselves impede the fluidization of solids just above the distribution plate, thereby increasing the likelihood of difficulties such as deposition and agglomeration of polymer particles.

Irrespective of the hole diameter, the corners of the fluidized bed defined by the inside surface of the side wall of the reactor and the gas distribution plate present a significant resistance to the fluidization of solids. In order to prevent the occurrence of problems of the types described above, it is necessary to maintain effective fluidization in these areas.

The pressure difference that develops across the gas distribution plate in a common fluidized-bed gas-phase polymerizer is in the range of 200 to 10,000 mmH$_2$O and the diameter of the polymerizer is usually in the range of 1 to 5 m. Given the pressure difference and diameter in these ranges, the gas distribution plate, if it is a single solid plate, must have a thickness of from several to 50 millimeters in order to insure sufficient strength.

If the gas distribution plate is divided into segments each of which is reinforced with a rib support or some other suitable means, sufficient strength is insured even if the plate has a small thickness. However, the rib supports impede the fluidization of solids and increase the chance of the occurrence of such troubles as the deposition and agglomeration of polymer particles.

SUMMARY OF THE INVENTION

An object of the present invention is to provide a gas distribution plate, for use with a fluidized-bed gas-phase polymerizer, that is capable of maintaining effective fluidization of polymer particles without the above described problems that results, for example, in deposition and agglomeration of polymer particles.

This and other objects are achieved by a gas distribution plate comprising a flat plate and a plurality of cylindrical or frustoconical pieces each having an oblique hole or a spiral groove cut in its surface and each fitting into a plurality of holes in the flat plate.

BRIEF DESCRIPTION OF THE DRAWINGS

FIG. 2A shows the case where the piece is of a large size to increase the pitch of the hole. FIGS. 2B and 2C show the case where the thickness of the piece is smaller than that of the flat plate to prevent the increase in the pitch of the holes; and FIG. 2D shows the case where three pieces are stacked in such a way that the pitch of the holes will not increase and yet there is no unevenness in the top and bottom surfaces of the completed distribution plate FIG. 2E shows the case where a plurality of oblique holes are stacked one on another.

FIG. 3A is a cross section of a gas distribution plate according to still another embodiment of the present invention in which a cylindrical piece having a spiral groove cut in the surface is fitted into a hole in the plate.

FIG. 3B is a cross section of a gas distribution plate according to a further embodiment of the present invention in which a frustoconical piece having a spiral groove cut in the surface is fitted into a hole in the plate.

FIG. 4A shows the cylindrical piece in both a front and a side view.

FIGS. 4B and 4C show two examples of the gas passageway in cross section taken on line A–A' of FIG. 4A.

FIG. 5 is a plan view of a gas distribution plate that generates convolute flows of a feed gas though cylindrical or frustoconical pieces fitted into holes in the plate. The arrows indicate the direction of gas flow out of the holes of the pieces.

FIG. 6 shows a cross section of a fluidized bed reactor.

DETAILED DESCRIPTION OF THE INVENTION

Figure 1A:
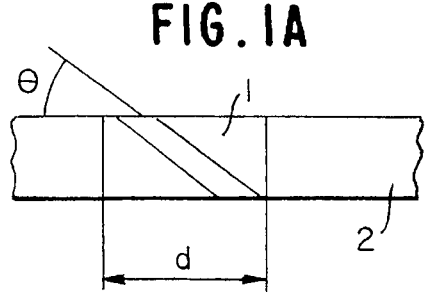
FIG. 1A is a cross section of a gas distribution plate according to one embodiment of the present invention in which a cylindrical piece having an oblique hole is fitted into a hole in the plate.
Figure 1B:
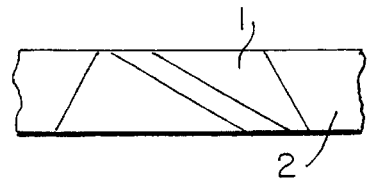
FIG. 1B is a cross section of a gas distribution plate according to another embodiment of the present invention in which a frustoconical piece having an oblique hole is fitted into a hole in the plate.

In order to solve the aforementioned problems, the present invention provides a unique gas distribution plate. Holes are cut in a flat plate 2 in such a way that cylindrical or frustoconical pieces 1 that each have an oblique hole in them as shown in FIGS. 1A and 1B, or a spiral groove, as shown in FIGS. 3A and 3B, will fit snugly. By fitting a plurality of pieces into a number of holes in the plate, a gas distribution plate having a plurality of passageways for a feed gas can be constructed.

Making oblique holes in a broad flat plate is very difficult, but it is fairly easy to make such holes in small pieces. By adopting this method, a gas distribution plate that is equivalent to a broad flat plate having a number of oblique gas passageways can be obtained more quickly and at much lower cost.

Generally, the equivalent diameter of each gas passageway must be at least five times as large as the average size of polymer particles to be produced. The term "equivalent diameter" used herein means a diameter of perfect circle whose area is equal to the cross-sectional area of the gas passageway (i.e., the area perpendicular to the gas passageway). If the equivalent diameter of the gas passageways is less than five times the average size of polymer particles, blockage is likely to occur in both the upper and lower parts of the gas distribution plate. Also, blockage of the distribution plate is less likely to occur if the cross-sectional shape of each gas passageway is not angular. In this respect, pieces having grooves, as shown in FIGS. 3A and 3B, and preferably one having a gas passage of the cross-sectional shape shown in FIG. 4B are superior to ones having a cross-sectional shape as shown in FIG. 4C.

The angle θ each gas passageway makes with the horizontal direction (see FIGS. 1A and 3A) is preferably adjusted to be smaller than a certain value. By so doing, polymer particles in the fluidized bed will not drop through the distribution plate even if the holes in the plate are of a large diameter and have only a relatively small amount of feed gas passing upward through them. The angle θ is appropriately within the range of 10 to 40 degrees.

Feed gas entering an oblique or spiral passageway blows upward at an angle with respect to the distribution plate and forms a stream that crawls along the upper surface of that plate. Compared to a vertical lift of feed gas that is supplied from a simple perforated plate, the crawling gas stream is capable of effectively blowing off polymer particles just above the distribution plate over a broad range. Hence, even if the distribution plate has holes that have a large pitch, polymer particles will not form a deposit or agglomerate in intermediate areas between the holes. This effect is maximized when the angle θ is within the range of 10 to 40 degrees; preferably 10 to 20 degrees.

If the pieces to be fitted into the holes in the flat plate have the same thickness as the latter, the completed gas distribution plate looks like a plate having oblique or spiral holes that is flat on both the top and bottom surfaces. This feature is effective in preventing troubles such as the deposition and agglomeration of polymer particles that would otherwise occur due to impeded fluidization above the distribution plate if caps were provided above the holes as in the prior art.

Pieces having an oblique hole or a spiral groove can be fitted in any desired direction, so the direction in which the feed gas is blown can be varied in different areas of the distribution plate.

As shown in FIG. 5, it is particularly preferred to fit the pieces 1 on the distribution plate 2 in such a way that the feed gas will create generally convolute flows because such flows insure uniform fluidization of polymer particles. As a further advantage, small aggregates of polymer particles can be rapidly pushed aside, using a convolute flow, towards the periphery of the distribution plate where they can be discharged from the reactor before they grow to an undesirably large size.

As regards local gas flows on the distribution plate, intermediate areas between holes are preferably exposed to the gas that is blown out of upstream holes so that polymer particles do not stay in these areas. This effectively prevents the occurrence of such troubles as the deposition and agglomeration of the polymer particles.

Polymer particles tend to be fluidized only insufficiently at corners of the fluidized bed, that is the regions defined by the inside surface of the side wall of the reactor and the gas distribution plate. This problem is solved by insuring that the pieces fitted in areas close to the side wall of the reactor produce gas jets that flow radially outward, so that these gas jets are directed towards the side wall of the polymerizer. In this way, the polymer particles at the corners of the fluidized bed are sufficiently fluidized to prevent the occurrence of such troubles as the deposition and agglomeration of polymer particles.

The pieces and the flat plate into which they are to be fitted are preferably electropolished or otherwise treated to provide a smooth surface as a further means of preventing the occurrence of such troubles as blockage of the holes and the deposition of polymer particles.

Figure 2A:
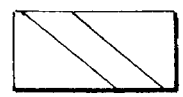
FIGS. 2A to 2E show five cases of a cylindrical piece having an oblique hole that is fitted into a hole in a thick gas distribution plate.
Figure 2A:
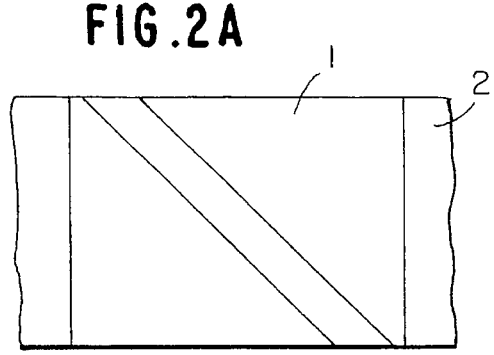

A gas distribution plate for use with a large polymerizer should have a thickness on the order of several tens of millimeters in order to have a solid structure. If the thickness of the pieces having oblique holes is increased and the angle θ held constant, the diameter d of these pieces would inevitably increase as shown in FIG. 2A. As a result, the pitch of the holes in the distribution plate would increase and polymer particles tend to stay in intermediate areas between holes.

Figure 2B:
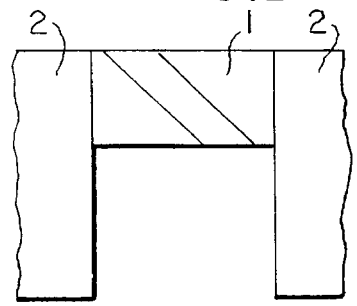
Figure 2C:
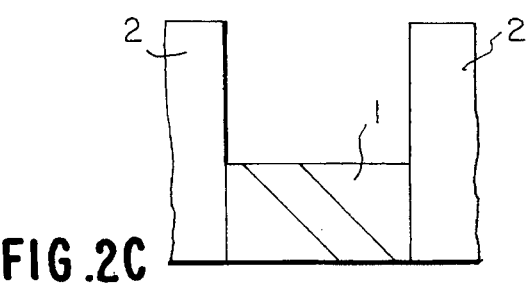
Figure 2D:
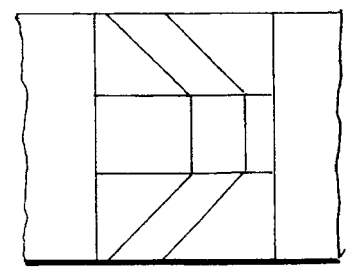
Figure 2E:
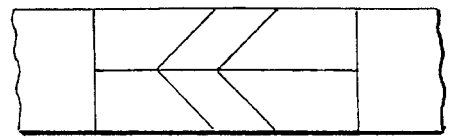

In order to construct a thick gas distribution plate according to the present invention, a plurality of pieces having an oblique hole or a spiral groove cut in the surface are stacked one on another as shown in FIG. 2D so that the pitch of holes in the plate is sufficiently reduced, thus avoiding the problems described above. Since the thick distribution plate retains adequate strength even if its diameter is increased, there is no need to divide it into segments and reinforce them with rib supports or other means. In other words, the present invention offers the advantage of obviating the use of rib supports and other reinforcing means that tend to cause poor fluidization of polymer particles.

As described above, the gas distribution plate of the present invention is characterized not only by the specified shape of holes through which a feed gas is to be blown but also by the method of fitting pieces having gas passageways into holes in the distribution plate. Because of these characteristics, the gas distribution plate of the present invention prevents blockage of holes in the plate, the filling of polymer particles down through the plate, the deposition of polymer particles on the inside surface of the side wall of the reactor and on the distribution plate, and the agglomeration of polymer particles.

Particles will usually plug holes unless the diameter of the holes is at least a certain multiple of the size of the polymer particles formed, as mentioned above. This also applies to preventing blockage in gas distribution plates of the present invention. Thus, the equivalent diameter of the gas passageways in the present invention must be at least a multiple of the average size of polymer particles formed. The chance of polymer deposition can be further reduced by surface finishing the pieces having an oblique hole or a spiral groove and the flat plate into which these pieces fit.

The gas distribution plate of the present invention is also characterized by a small angle θ of the oblique or spiral gas passageway from the horizontal in order to effectively prevent polymer particles from dropping down through the distribution plate. A further advantage of a small angle θ is that a feed gas passing through the oblique or spiral passageways to be blown upward will crawl along the upper surface of the plate. In addition, depending on the shape of the outlet of each passageway, the gas will diverge and spread out like a fan in the horizontal direction. Because of these effects, polymer particles lying just above the distribution plate, particularly in intermediate areas between holes where stagnancy is most likely to occur can be completely blown off. This prevents troubles such as the deposition and agglomeration of the polymer particles lying just above the distribution plate.

If the pieces are fitted into holes in a flat plate of the same thickness, a distribution plate having no unevenness in its surfaces can be constructed. Such a plate has no recesses in either the top or bottom surface that can trap polymer particles, and no projections on the top surface that can present resistance to a smooth flow of the polymer particles. Resistance to the flow of polymer particles can be further reduced by smoothing the surfaces of the pieces and the flat plate into which the pieces fit.

The pieces may be fitted in such a way that the feed gas is blown against intermediate areas where poor fluidization tends to occur such as areas between holes in the distribution plate and the corners defined by the inside surface of the side wall of the reactor and the distribution plate. Such an arrangement causes polymer particles in those areas to be blown off, thus avoiding problems such as their deposition and agglomeration, as mentioned above.

If the pieces are fitted to create convolute gas flows over the distribution plate, efficient fluidization is realized throughout the fluidized bed. Even if polymer aggregates form, they are rapidly displaced radially outward along the upper surface of the distribution plate by the centrifugal force of the convolute flows and, once they reach the side wall of the reactor, they will swirl along its inside surface where they can be withdrawn from the polymerizer via a discharge pipe provided in the side wall. In this way, stagnancy of polymer aggregates in the polymerizer and hence, subsequent troubles such as operation shutdown and deterioration in the quality of the product polymer, can be effectively prevented.

The following non-limiting examples are provided to further illustrating the present invention.

EXAMPLE 1

Figure 1C:
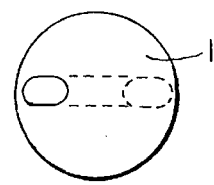
FIG. 1C shows the cylindrical piece in both a front and a side view.

A gas distribution plate having pieces of the type shown in FIG. 1 (with oblique holes bored through them) was incorporated into a fluidized-bed gas-phase polymerizer having an inside diameter of 480 mm or 1200 mm and propylene was polymerized with this reactor. The shape parameters of the pieces and distribution plate are shown in Table 1.

In Run Nos. 1 to 6, all pieces except for the two outermost rows were fitted in such a way that the feed gas passing through the distribution plate would create generally convolute flows. The pieces in the two outermost rows were positioned to blow the gas towards the side wall of the polymerizer. (The angle Φ (see, FIG. 5) of the gas blown from these holes measured from a line extending from the center of the reactor radially outward was in the range of 105 to 150 degrees). No troubles such as the agglomeration of polymer particles occurred in Run Nos. 1 to 6.

In Run Nos. 7 and 8, the angle Φ was adjusted to 90 degrees and polymer aggregates formed at the corners defined by the inside surface of the side wall of the reactor and the gas distribution plate.

In Run Nos. 9 and 10, no convolute flows were created and instead all pieces were fitted so as to blow the feed in a fixed direction. Large polymer aggregates formed at the corners where no contact with the gas took place.

In Run No. 11, the equivalent diameter of the gas passageways was so small that the distribution plate plugged up as soon as the reaction started and the operation had to be shut down.

In Run Nos. 12 to 17 a thick gas distribution plate was used. In Run Nos. 12 and 13, the pieces were fitted as shown in FIG. 2B; in Run Nos. 14 and 15, the pieces were fitted as shown in FIG. 2C; and in Run Nos. 16 and 17, the pieces were fitted as shown in FIG. 2D. No problems were observed in Run Nos. 16 and 17. In Run Nos. 12 and 13, polymer particles deposited in the lower part of pieces, causing the holes to plug up. In Run Nos. 14 and 15, polymer aggregates formed in the upper part of the pieces as soon as the reaction started and the operation had to be shut down.

to 150 degrees). No troubles such as the agglomeration of polymer particles occurred in Run Nos. 1 to 8.

In Run Nos. 9 and 10, the angle $\Phi$ was adjusted to 90 degrees. Polymer aggregates formed at the corners defined by the inside surface of the side wall of the reactor and the gas distribution plate.

TABLE 1

| Run | Piece diameter (mm) | Angle (deg.) | Hole Pitch (mm) | Equivalent diameter of gas passageway (mm) | Thickness of dispersing plate (mm) | Unevenness in the surfaces of dispersing plate | Gas blowing direction |
|---|---|---|---|---|---|---|---|
| 1 | 20 | 20 | 30 | 6 | 12 | no | generally convolute flows, the pieces in the two outermost circles blew the gas towards the side wall of polymerizer |
| 2 | 20 | 35 | 30 | 6 | 12 | no | |
| 3 | 30 | 20 | 40 | 6 | 12 | no | |
| 4 | 30 | 20 | 40 | 10 | 12 | no | |
| 5 | 30 | 35 | 40 | 6 | 12 | no | |
| 6 | 30 | 35 | 40 | 10 | 12 | no | |
| 7 | 20 | 20 | 30 | 6 | 12 | no | convolute flows |
| 8 | 30 | 35 | 40 | 10 | 12 | no | |
| 9 | 20 | 20 | 30 | 6 | 12 | no | only one direction |
| 10 | 30 | 35 | 40 | 10 | 12 | no | |
| 11 | 30 | 35 | 40 | 3 | 12 | no | |
| 12 | 20 | 20 | 30 | 6 | 30 | yes | |
| 13 | 30 | 35 | 40 | 10 | 30 | yes | |
| 14 | 20 | 20 | 30 | 6 | 30 | yes | |
| 15 | 30 | 35 | 40 | 10 | 30 | yes | convolute flows (as in Runs 1–6) |
| 16 | 20 | 20 | 30 | 6 | 30 | no (three pieces in stack) | |
| 17 | 30 | 35 | 40 | 10 | 30 | no (three pieces in stack) | |

EXAMPLE 2

A gas distribution plate having pieces of the type shown in FIG. 3 (with spiral grooves cut in the surface) was incorporated into a fluidized-bed gas-phase polymerizer having an inside diameter of 480 mm and propylene was polymerized with this reactor. The shape parameters of the pieces and distribution plate are shown in Table 2.

In Run Nos. 1 to 8, all pieces except for the two outermost rows were fitted in such a way that the feed gas passing through the distribution plate would create generally convolute flows. The pieces in the two outermost rows were alligned to blow the gas towards the side wall of the polymerizer. (The angle $\Phi$ (see, FIG. 5) of the gas blown from these holes measured from a line extending from the center of the reactor radially outward was in the range of 105

In Run Nos. 11 and 12, no convolute flows were created and instead all pieces were fitted so as to blow the feed gas in a fixed direction. Large polymer aggregates formed at the corners where no contact with the gas took place.

In Run Nos. 13 and 14, the equivalent diameter of the gas passageways was so small that the distribution plate plugged up as soon as the reaction started and the operation had to be shut down.

In Run Nos. 15 to 17, pieces were fitted into a flat plate having a larger thickness so that there were recesses in areas of the completed distribution plate that corresponded to the inserted pieces. After prolonged operation, the distribution plate plugged up in areas close to the side wall of the reactor and polymer aggregates formed.

TABLE 2

| Run | Piece diameter (mm) | Angle (deg.) | Hole Pitch (mm) | Equivalent diameter of gas passageway (mm) | Unevenness in the surfaces of dispersing plate | Gas blowing direction |
|---|---|---|---|---|---|---|
| 1 | 15 | 12 | 25 | 5 | no | generally convolute flows, the pieces in the two outermost circles blew the gas towards the side wall of polymerizer |
| 2 | 15 | 12 | 25 | 7 | no | |
| 3 | 15 | 35 | 25 | 5 | no | |
| 4 | 20 | 12 | 32 | 5 | no | |
| 5 | 20 | 12 | 32 | 7 | no | |
| 6 | 20 | 35 | 40 | 5 | no | |
| 7 | 30 | 12 | 40 | 6 | no | |
| 8 | 30 | 12 | 40 | 10 | no | |
| 9 | 15 | 12 | 25 | 5 | no | convolute flows |
| 10 | 20 | 12 | 32 | 5 | no | |
| 11 | 15 | 12 | 25 | 5 | no | only one direction |
| 12 | 20 | 12 | 32 | 7 | no | |

TABLE 2-continued

| Run | Piece diameter (mm) | Angle (deg.) | Hole Pitch (mm) | Equivalent diameter of gas passageway (mm) | Unevenness in the surfaces of dispersing plate | Gas blowing direction |
|---|---|---|---|---|---|---|
| 13 | 12 | 30 | 25 | 1 | no | convolute flows |
| 14 | 12 | 30 | 25 | 3 | no | |
| 15 | 15 | 12 | 25 | 5 | yes | |
| 16 | 20 | 12 | 32 | 6 | yes | |
| 17 | 30 | 35 | 40 | 7 | yes | |

While the invention has been described in detail and with reference to specific embodiments, it will be apparent to one skilled in the art that various changes and modifications can be made in the described embodiments without departing from the spirit and scope of the invention.

What is claimed is:

1. A gas distribution plate for use with a fluidized-bed gas-phase polymerizer reactor comprising: a flat plate and a plurality of cylindrical or frustoconical pieces each having an oblique hole or a spiral groove cut in a surface of each piece and each piece fitting into a respective hole in said flat plate, said oblique hole or said spiral groove being disposed asymmetrically with respect to the central axis of said piece.

2. A gas distribution plate according to claim 1, wherein each said cylindrical or frustoconical piece is a solid piece having a single oblique hole or a single spiral groove cut in said surface.

3. A gas distribution plate according to claim 2 wherein said cylindrical or frustoconical pieces have an oblique hole bored through them.

4. A gas distribution plate according to claim 3, wherein said pieces are fitted in different orientations so that a feed gas can be blown in any desired direction.

5. A gas distribution plate according to claim 3, wherein said pieces are fitted in such orientations as to create convolute gas flows over said gas distribution plate.

6. A gas distribution plate according to claim 3, wherein said pieces are oriented in the respective holes such that a feed gas is blown against corners of a fluidized-bed gas-phase polymerizer reactor having a sidewall with an inside surface, said corners being defined by the inside surface of the side wall of said fluidized-bed polymerizer reactor and said gas distribution plate.

7. A gas distribution plate according to claim 3, wherein said gas distribution plate is a one-piece solid plate.

8. A gas distribution plate according to claim 2, wherein said cylindrical or frustoconical pieces have a spiral groove cut in the surface.

9. A gas distribution plate according to claim 8, wherein said pieces have the same thickness as said flat plate so that no unevenness occurs in either the top or bottom surface of said gas distribution plate.

10. A gas distribution plate according to claim 8, wherein said pieces are fitted in different orientations so that a feed gas can be blown in any desired directions.

11. A gas distribution plate according to claim 8, wherein said pieces are fitted in such orientations as to create convolute gas flows over said gas distribution plate.

12. A gas distribution plate according to claim 8, wherein said pieces are presented in the respective holes such that a feed gas is blown against corners of a fluidized bed polymerizer reactor having a side wall having an inside surface, said corners defined by the inside surface of the side wall of said fluidized-bed polymerizer reactor and said gas distribution plate.

13. A gas distribution plate for use with a fluidized-bed gas-phase polymerizer reactor comprising: a flat plate and a plurality of cylindrical or frustoconical pieces each having an oblique hole or a spiral groove cut in a surface of each piece, said plurality of pieces being stacked one on another and fitting into a respective single hole in said flat plate to form a continuous passageway.

14. A gas distribution plate according to claim 13 wherein said stacked pieces collectively have the same thickness as said flat plate so that no unevenness occurs in either the top or bottom surface of said gas distribution plate.

15. A gas distribution plate according to claim 13, wherein a plurality of said pieces are stacked one on another in a single hole in the gas distribution plate such that a first piece having an oblique hole and a second piece having an oblique hole are placed in the hole in the gas distribution plate, and at least one piece having a vertical hole is present between said first and second pieces to form a continuous passageway.

16. A gas distribution plate for use with a fluidized-bed gas-phase polymerizer reactor comprising: a flat plate and a plurality of cylindrical or frustoconical pieces each having a spiral groove cut in a surface of each piece and each piece fitting into a respective hole in said flat plate, and wherein said pieces are oriented in the respective holes such that a feed gas is blown against corners of a fluidized bed polymerizer reactor having a sidewall having an inside surface, said corners defined by the inside surface of the side wall of said fluidized-bed polymerizer reactor and said gas distribution plate.

17. A gas distribution plate for use with a fluidized-bed gas-phase polymerizer reactor comprising: a flat plate and a plurality of cylindrical or frustoconical pieces each having an oblique hole or a spiral groove cut in a surface of each piece and each piece fitting into a respective hole in said flat plate, wherein said pieces have the same thickness as said flat plate so that no unevenness occurs in either the top or bottom surface of said gas distribution plate.

18. A gas distribution plate for use with a fluidized-bed gas-phase polymerizer reactor comprising: a flat plate and a plurality of cylindrical or frustoconical pieces each having an oblique hole or a spiral groove cut in a surface of each piece and each piece fitting into a respective hole in said flat plate, and wherein said pieces are oriented in the respective holes such that a feed gas is blown in a generally convolute flow in said reactor.

* * * * *